US012416923B2

(12) United States Patent
Yang

(10) Patent No.: US 12,416,923 B2
(45) Date of Patent: Sep. 16, 2025

(54) ROBOT CONTROL METHOD, A ROBOT CONTROL SYSTEM AND A MODULAR ROBOT

(71) Applicant: BEIJING KE YI TECHNOLOGY CO., LTD., Beijing (CN)

(72) Inventor: Jianbo Yang, Beijing (CN)

(73) Assignee: BEIJING KE YI TECHNOLOGY CO., LTD., Beijing (CN)

( * ) Notice: Subject to any disclaimer, the term of this patent is extended or adjusted under 35 U.S.C. 154(b) by 412 days.

(21) Appl. No.: 17/900,878

(22) Filed: Sep. 1, 2022

(65) Prior Publication Data

US 2022/0413511 A1 Dec. 29, 2022

Related U.S. Application Data

(63) Continuation of application No. PCT/CN2021/070428, filed on Jan. 6, 2021.

(30) Foreign Application Priority Data

Jan. 7, 2020 (CN) .......................... 202010015756.9

(51) Int. Cl.
*G05D 1/02* (2020.01)
*G05B 19/4155* (2006.01)
*G05D 1/00* (2024.01)

(52) U.S. Cl.
CPC ....... *G05D 1/0272* (2013.01); *G05B 19/4155* (2013.01); *G05D 1/0011* (2013.01); *G05B 2219/50391* (2013.01)

(58) Field of Classification Search
CPC ............... G05D 1/0272; G05D 1/0011; G05B 19/4155; G05B 2219/50391;
(Continued)

(56) References Cited

U.S. PATENT DOCUMENTS

2006/0253224 A1 11/2006 Tani et al.
2017/0064926 A1* 3/2017 Gutierrez ................. A01K 5/00
(Continued)

FOREIGN PATENT DOCUMENTS

CN 101826251 A * 9/2010
CN 106774309 A 5/2017
(Continued)

OTHER PUBLICATIONS

Translation of CN101826251A (Year: 2009).*

*Primary Examiner* — Sahar Motazedi
(74) *Attorney, Agent, or Firm* — Workman Nydegger

(57) ABSTRACT

The present disclosure relates to the field of robots, and particularly relates to a robot control method, a robot control system and a modular robot. The robot control method includes the steps of: T1: providing a robot, with at least one wheel and at least one motion posture; T2: regulating the robot to a motion posture, saving motion-posture information corresponding to the motion posture, and generating preset action control information based on the speed of the wheel and the motion-posture information; T3: constructing and forming an operating model based on the preset action control information; and T4: outputting, by the operating model, actual motion control information of a motion according to user's input to control the robot to perform the motion. Thus, it is convenient to set motion modes to meet the diverse needs of users, and the design space of the robot suitable for more scenarios is increased.

10 Claims, 9 Drawing Sheets

(58) Field of Classification Search
CPC ........... G05B 2219/40302; G05B 2219/40304; G05B 2219/45007; G05B 19/19; G05B 2219/35349; B25J 9/1617; B25J 5/007; B25J 9/08

See application file for complete search history.

(56) References Cited

U.S. PATENT DOCUMENTS

| | | | |
|---|---|---|---|
| 2019/0202428 A1 | 7/2019 | Xiong et al. | |
| 2019/0204821 A1* | 7/2019 | Yoon | G05D 1/0223 |
| 2020/0031274 A1* | 1/2020 | Redick | B60Q 1/507 |
| 2021/0347043 A1* | 11/2021 | Yang | B25J 9/08 |

FOREIGN PATENT DOCUMENTS

| | | |
|---|---|---|
| CN | 108189029 A | 6/2018 |
| CN | 108326846 A | 7/2018 |
| CN | 108356806 A | 8/2018 |
| CN | 109648568 A | 4/2019 |
| CN | 111190387 A | 5/2020 |
| JP | H06205238 A | 7/1994 |
| JP | 2021506604 A | 2/2021 |
| WO | 2017166816 A1 | 10/2017 |
| WO | 2019120150 A1 | 6/2019 |

* cited by examiner

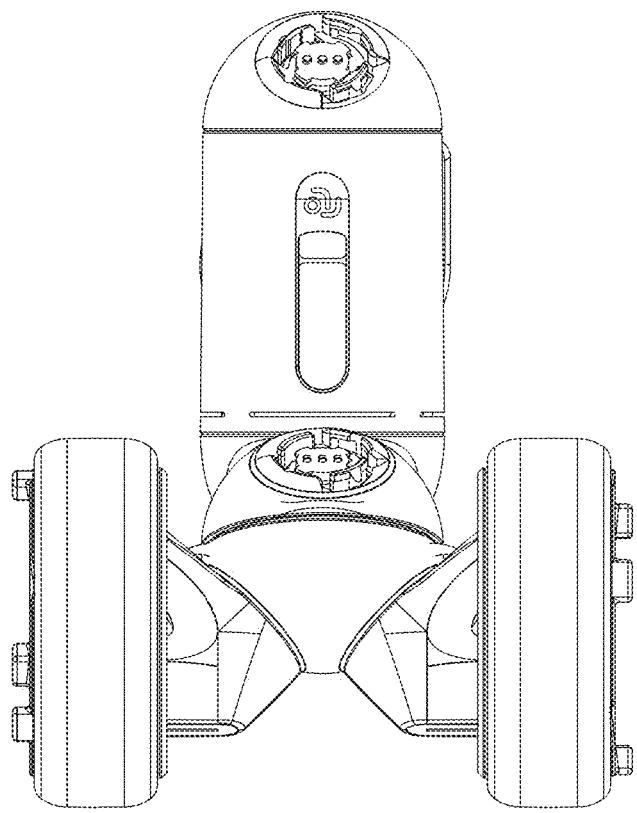
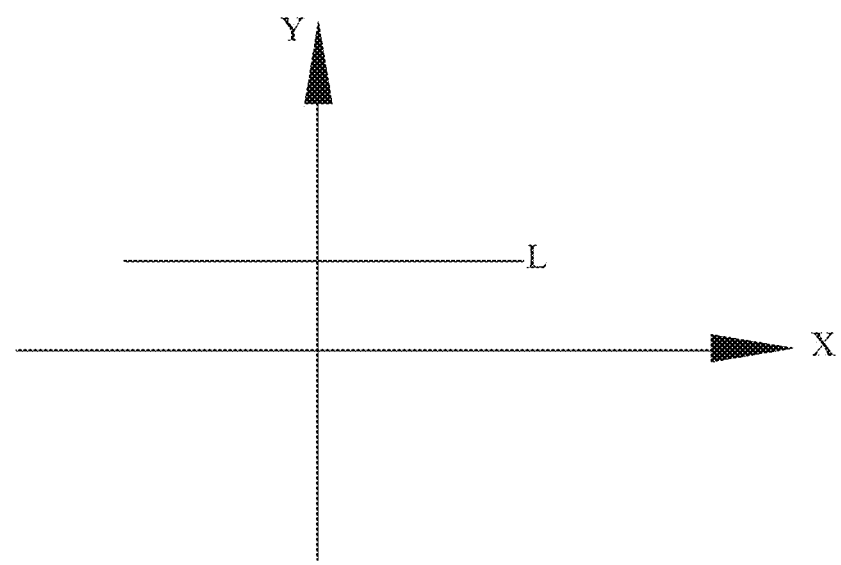
FIG. 2A

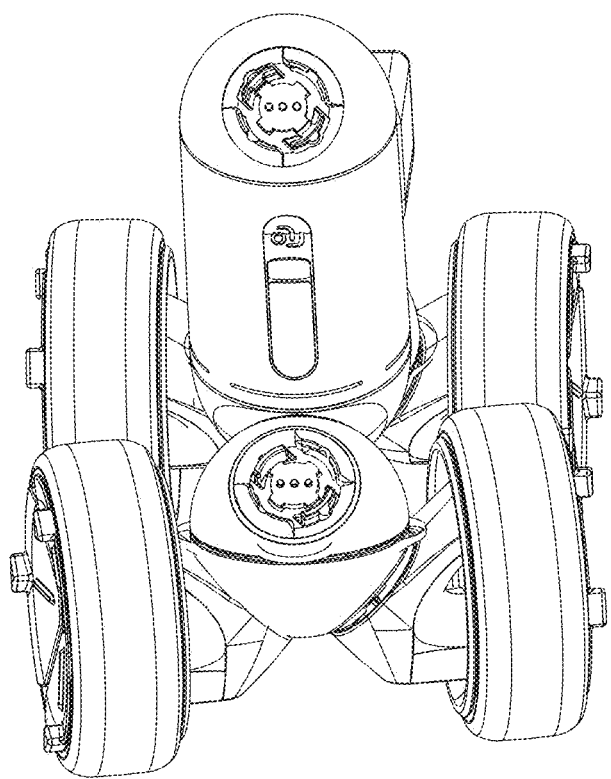
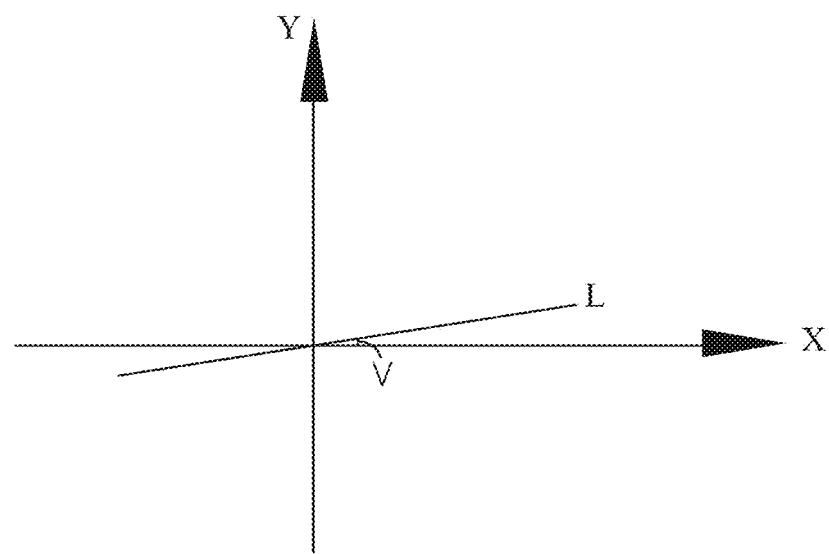
FIG. 2B

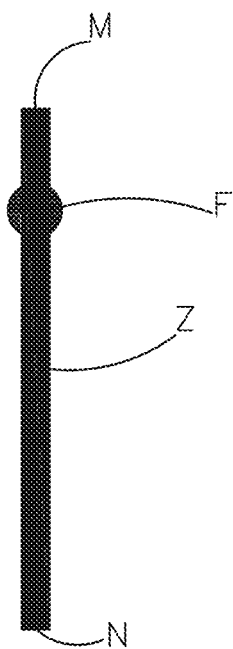

FIG. 6

```
┌──────────────────────────────────────────┐
│ setting the maximum actual speed of one  │
│ of the wheels during actual motion and   │─── S21
│ the speed ratio of each wheel; and       │
└──────────────────────────────────────────┘
                     │
                     ▼
┌──────────────────────────────────────────┐
│ converting the actual maximum speed of   │
│ the other wheels according to the speed  │─── S22
│ ratio                                    │
└──────────────────────────────────────────┘
```

FIG. 7

ROBOT CONTROL METHOD, A ROBOT CONTROL SYSTEM AND A MODULAR ROBOT

TECHNICAL FIELD

The disclosure relates to the field of robots, in particular to a robot control method, a robot control system and a modular robot.

BACKGROUND

Robots have been widely used in life and industry, e.g., used for training students' creative thinking skills in teaching and used for welding, spraying, assembling, carrying and other operations in automated production. Although as an execution system, a robot has great flexibility to complete different work tasks, an existing robot often has only one main function for specific use purposes and occasions due to fixed freedom degree and configuration and lack of functional scalability and re-configurability. In addition, it is very expensive to develop a specific robot for each field and each application, which severely restricts the popularization and application of robots. Therefore, re-configurable robots come into being.

Re-configurable robots are usually obtained by combining a main module and multiple basic modules having the same shape, structure, and connecting surfaces for combining. However, the user cannot verify whether the combined structure of a modular robot is correct or not, which results in a lot of repetitive assembly work to the user and a poor user experience. At present, many reconstructed robots are also provided with wheels, which controls different motion states and drive the main module to move to different positions to help people complete some designated tasks, such as shooting, detection and other tasks. At present, in the process of adjusting the motion states of the robot, the main module and the basic module are usually adjusted individually, or the wheels and the sub-modules are adjusted individually, and it is difficult to simultaneously adjust the main modules and the main modules and the wheels, resulting in limited adjustment posture, which is difficult to meet the diverse needs of users; or the procedure for setting control-action information is cumbersome, the adjustment speed is slow, and the adjustment operation is complicated, which seriously affects user experience.

SUMMARY

In view of the above problems, the present disclosure provides a robot control method, a robot control system and a modular robot.

A technical solution of the present disclosure for solving the technical problems is to provide a robot control method, which includes the steps of: T1: providing a robot, with at least one wheel and at least one motion posture; T2: regulating the robot to a motion posture, saving motion-posture information corresponding to the motion posture, and generating preset action control information based on the speed of the wheel and the motion-posture information; T3: constructing and forming an operating model based on the preset action control information; and T4: outputting, by the operating model, actual motion control information of a motion according to user's input to control the robot to perform the motion.

Preferably, in the above step T2, the speed of the wheel is obtained by pushing the robot to walk on the road in the corresponding motion posture, or the speed is obtained by controlling the robot to move via an app, and/or the speed is obtained by user customization.

Preferably, the number of the wheels is at least two, the motion posture includes a forward posture, a left-turn posture, and a right-turn posture, and the corresponding motion-posture information includes forward-posture information, left-turn-posture information, and right-turn-posture information. The step T2 includes the steps of: T21: controlling the robot to move forward, obtaining the forward speed ratio of each wheel, and determining forward preset action control information according to the forward-posture information and the forward speed ratio of each wheel; T22: controlling the robot to turn left, obtaining the left-turn speed ratio of each wheel, and determining left-turn preset action control information according to the left-turn-posture information and the left-turn speed ratio of each wheel; and T23: controlling the robot to turn right, obtaining the right-turn speed ratio of each wheel, and determining right-turn preset action control information according to the right-turn-posture information and the right-turn speed ratio of each wheel.

Preferably, the step T2 further includes the steps of: T24: controlling the robot to move forward, saving the forward-posture information and the maximum forward speed thereof, and determining forward preset action control information according to the forward-posture information, the maximum forward speed and/or a customized speed; T25: controlling the robot to turn left, saving the left-turn-posture information and the maximum left-turn speed thereof, and determining left-turn preset action control information according to the left-turn-posture information, the maximum left-turn speed and/or a customized speed; and T26: controlling the robot to turn right, saving the right-turn-posture information and the maximum right-turn speed thereof, and determining right-turn preset action control information according to the right-turn-posture information, the maximum right-turn speed and/or a customized speed.

Preferably, the step T3 includes the steps of: T31: constructing a coordinate system, defining a circular area or a fan-shaped area with the origin as the center on the coordinate system to form a manipulation area, and the fan-shaped area including areas located in the first quadrant and the second quadrant; T32: mapping the forward preset action control information, the left-turn preset action control information, and the right-turn preset action control information to the upper vertex, the left vertex and the right vertex of the manipulation area, respectively.

Preferably, the step T3 further includes the step of: T33: defining user's input as a control point located in the coordinate system, when the control point is located in the first and second quadrants, the control point located in the first quadrant being a forward-right-motion control point, and forward-right preset action control information being obtained by the interpolation operation of the forward preset action control information and the right-turn preset action control information; the control point located in the second quadrant being a forward-left-motion control point, forward-left preset action control information being obtained by the interpolation operation of the forward preset action control information and the left-turn preset action control information; the control point located on the Y-axis of the coordinate system being obtained by converting the forward preset action control information according to the distance between the control point and the center.

Preferably, the fan-shaped area further includes areas located in the third quadrant and the fourth quadrant, and there are blank areas where no control points are disposed between the first quadrant and the fourth quadrant and between the second quadrant and the third quadrant.

Preferably, the step T3 further includes the step of: T34: interpolating to the lower vertex of the manipulation area according to the forward preset action control information to form backward preset action control information; interpolating to the third quadrant of the manipulation area according to the backward preset action control information and the left-turn preset action control information to form backward-left preset action control information; interpolating to the fourth quadrant of the manipulation area according to the backward preset action control information and the right-turn preset action control information to form backward-right preset action control information.

Preferably, an operating disc is provided on a Graphic User Interface for operating the robot, and the operating disc corresponds to the circular area or the fan-shaped area on the coordinate system. The step T4 includes the steps of: T41: operating on the operating disc to form an input; T42: the operating model calculating the actual motion control information according to the control point corresponding to the input to control the robot to perform a motion.

Preferably, at least one of the forward speed ratio, the left-turn speed ratio, and the right-turn speed ratio is adjusted according to a preset adjustment ratio.

In order to solve the above technical problems, the present disclosure further provides a robot control system, which includes a robot that is assembled from a main body and at least one wheel connected to the main body and has an initial entity structure, a memory, and one or more programs, where one or more of the programs are stored in the memory, the memory communicates with the main body, and the programs are used to execute the robot control method as described above.

Preferably, the main body includes a plurality of module units, the robot control system further includes a controller, and signal transmission can be performed between the controller and the robot. The controller includes a display screen, which presents at least one operating disc, and the user controls the motion of the robot by manipulating the operating disc.

Preferably, the main body includes a plurality of module units, the robot control system further includes a controller, and signal transmission can be performed between the controller and the robot. The controller includes a display screen, which presents at least one ratio bar, and the user adjusts at least one of the forward speed ratio, the left-turn speed ratio, and the right-turn speed ratio by manipulating the ratio bar.

Preferably, a first edit button and a second edit button are provided on the display screen, the first edit button is used to set the robot to a corresponding motion posture, and the second edit button is used to set the speed of the wheel.

In order to solve the above technical problems, the present disclosure further provides a modular robot, which is used to execute the above-mentioned robot control method.

Compared with the prior art, the robot control method, the robot control system and the modular robot of the present disclosure have the following beneficial effects.

The robot control method includes the steps of: providing a robot, with at least one wheel and at least one motion posture; regulating the robot to a motion posture, saving the motion-posture information corresponding to the motion posture, and generating preset action control information based on the speed and the motion-posture information; constructing and forming an operating model based on the preset action control information; and the operating model outputting actual motion control information of a motion according to user's input to control the robot to perform the motion. In the robot control method of the present disclosure, the robot can be adjusted to a corresponding motion posture according to user's needs, and the motion-posture information and speed thereof are saved to generate preset action control information, which greatly improves the convenience of the robot and facilitates the user to set motion modes, while greatly enriching the robot's motion modes to meet the diverse needs of users, and increasing the design space of the robot to make it suitable for more scenarios.

The user can simply set forward preset action control information, left-turn preset action control information, and right-turn preset action control information. The preset action control information of other defined motion postures is obtained through the interpolation algorithm, which makes the setting simple and fast.

The preset action control information is mapped to a circular area or a fan-shaped area, so that the user can easily and quickly operate the robot and have a better experience.

The setting of action control information can be completed by pushing the robot to walk on the ground. The operation is simple and fast, which improves the user experience, and can customize the motion of the robot according to the needs of the user to meet the different needs of users and improve the fun of the user playing with the robot.

The step T2 includes the steps of: T21: controlling the robot to move forward, obtaining the forward speed ratio of each wheel, and determining the forward preset action control information according to the forward-posture information and the forward speed ratio of each wheel; T22: controlling the robot to turn left, obtaining the left-turn speed ratio of each wheel, and determining the left-turn preset action control information according to the left-turn-posture information and the left-turn speed ratio of each wheel; and T23: controlling the robot to turn right, obtaining the right-turn speed ratio of each wheel, and determining the right-turn preset action control information according to the right-turn-posture information and the right-turn speed ratio of each wheel. The forward speed ratio, the left-turn speed ratio and the right-turn speed ratio are all obtained in real time by pushing the robot to move. Therefore, the forward preset action control information, the left-turn preset action control information and the right-turn preset action control information set according to the obtained forward speed ratio, left-turn speed ratio and right-turn speed ratio can be better adapted to the robot, which can improve the adaptability of motions of the robot and obtain a better motion state.

At least one of the forward speed ratio, the left-turn speed ratio, and the right-turn speed ratio is adjusted according to a preset adjustment ratio, so that the forward speed ratio, the left-turn speed ratio and the right-turn speed ratio can be well adjusted according to different operating environments, which further improves the stability and flexibility of motions of the robot, and ensures a better user experience.

At least one of the forward speed ratio, the left-turn speed ratio and the right-turn speed ratio is adjusted by direct editing or input. When in some relatively poor environments, the speed obtained by pushing the robot to move is adjusted, which can further improve the adaptability of the speed and improve the stability and coordination of motions of the robot.

The robot control system and the modular robot of the present disclosure also have the same beneficial effects as the robot control method described above.

BRIEF DESCRIPTION OF THE DRAWINGS

FIG. 2A is a schematic diagram of the robot in a straight posture according to the first embodiment of the present disclosure.

FIG. 2B is a schematic diagram of the robot in a right-turn posture according to the first embodiment of the present disclosure.

FIG. 6 is a schematic diagram of a ratio bar of the robot control method according to the first embodiment of the present disclosure when sliding the ratio bar to set the speed.

FIG. 7 is a schematic diagram of a sub-flowchart of the robot control method according to the first embodiment of the present disclosure when the speed is obtained through user customization.

DETAILED DESCRIPTION

In order to make the objectives, technical solutions, and advantages of the present disclosure clearer, the present disclosure is further described in detail below with reference to the accompanying drawings and embodiments. It should be understood that the specific embodiments described herein are provided for illustration only, and not for the purpose of limiting the disclosure.

First Embodiment

Figure 1:
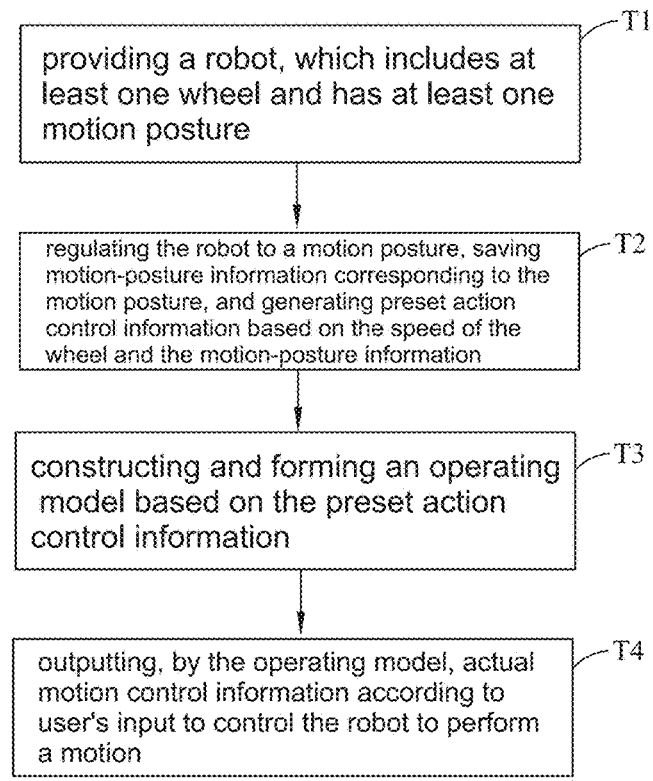
FIG. 1 is a schematic flowchart of a robot control method according to a first embodiment of the present disclosure.

Referring to FIG. 1, a first embodiment of the present disclosure provides a robot control method for controlling a robot to perform corresponding actions. The robot includes at least one wheel and a main body connected to the wheel. The robot has at least one motion posture.

In some other embodiments, the robot is a modular robot, and the main body of the robot includes at least two module units. One of the at least two module units is connected to the wheel, and each of the module units includes at least one sub-module connected to and rotatable with respect to one of the wheels. That is, when the number of the sub-modules and the wheels is one, one end of the sub-module is connected to the wheel, and the wheel and the sub-modules can be relatively rotated. When the number of the sub-modules and wheels is one and two respectively, two ends of the sub-module are respectively connected to one of the wheels. When each of the module units includes at least two sub-modules, any two adjacent sub-modules are connected and rotated with each other. For example, two sub-modules can be relatively rotated; preferably, each module unit includes an upper hemisphere and a lower hemisphere that can be relatively rotated, and two ends of one hemisphere are respectively connected to the two wheels. Each sub-module includes at least a docking part; each docking part is provided with an interface; each interface has unique interface identification information; and the module units are connected through the docking part. It can be understood that when each sub-module includes at least two docking parts, the two module units are connected by one docking part of one of the two module units and one docking part of the other of the two module units to form a virtual connection surface at the connection of the two module units. The two module units can rotate based on the virtual connection surface, and a plane where at least another docking part on at least one of the two module units is located intersects with the virtual connection surface. Similarly, each wheel is provided with a docking part; each docking part is provided with a docking opening; each wheel has corresponding identification information; each docking opening has unique interface identification information; and the modular unit is connected to the wheel through the docking openings thereof.

In order to facilitate subsequent description and understanding, the following definitions are made here. Configuration information includes but is not limited to one or more of module type information, position information, module quantity information, and initial angle information between the two sub-modules. The configuration information also includes one or more of type information of the wheel, position information of the wheel, quantity information of the wheel, and initial angle information between the sub-module and the wheel. For example, when the number of the wheels is two, type information of the wheels can be defined as left wheel and right wheel; when the number of the wheels is four, type information of the wheels can be defined as forward-left wheel, forward-right wheel, backward-left wheel and backward-right wheel. Of course, the type information of the wheels can also be other names, as long as the wheels can be marked and identified. The configuration information is configured to define a connection relationship between adjacent module units and/or between wheels and sub-modules. The position information is configured to record interface identification information of the two docking parts by which the adjacent module units are connected and interface identification information of the two docking parts by which the wheel and the sub-module are connected. The interface identification information of each docking part represents the position of the docking part on the module unit in which the docking part is located and the position of the wheel with respect to the sub-module. Therefore, the position information of each module unit and the position information of the wheel with respect to the sub-module represents the absolute position thereof in a three-dimensional spatial configuration or a planar configuration. Module units of the same type are set with the same module type identifier. For example: cell bodies have the same module type identifier while single cell bodies have the same module type identifier, and the module type identifier of the cell bodies are inconsistent with the module type identifier of the single cell bodies. In the case of a plurality of types of single cell bodies, each type of single cell bodies has the same module type identifier, and different types of single cell bodies have different module type identifiers, such that the module type information of the module units can be obtained by recognizing the module type identifiers. The initial angle information between the two sub-modules refers to a relative angle value between the upper and lower sub-modules in each module unit. The module quantity information refers to the quantity of module units. The process of recognizing the interface identification information of the two docking parts by which two adjacent module units are connected to each other between the two adjacent module units refers to a process of face recognition, and the position information of the module units can be obtained by performing the face recognition. It may be understood that the definitions here are also applicable to other embodiments of this specification.

The robot control method includes the steps of:
T1: providing a robot, with at least one wheel and at least one motion posture;
T2: regulating the robot to a motion posture, saving motion-posture information corresponding to the motion posture, and generating preset action control information based on the speed of the wheel and the motion-posture information;
T3: constructing and forming an operating model based on the preset action control information; and
T4: outputting, by the operating model, actual motion control information of a motion according to user's input to control the robot to perform the motion.

It can be understood that in the step T1, the robot can communicate with a remote terminal. In addition, when the robot does not need to communicate with the remote terminal and can perform the operation of the subsequent steps by itself, the robot can perform the module unit of the subsequent steps by itself.

It can be understood that the step T2 is: regulating the robot to a motion posture, saving motion-posture information corresponding to the motion posture, and generating preset action control information based on the speed of the wheel and the motion-posture information. The motion postures of the robot includes any one or more of a forward posture, a left-turn posture, a right-turn posture, a backward posture, a forward-left posture, a forward-right posture, a backward-left posture, a backward-right posture and a stop posture. The corresponding motion-posture information includes forward-posture information, left-turn-posture information, and right-turn-posture information.

Referring to FIG. 2A and FIG. 2B, in this embodiment, the motion posture is illustrated with the number of the wheels being four. Establish a coordinate system, which includes an X-axis and a Y-axis perpendicular to each other; when the center line of two wheels on the same row coincides with the X-axis, the motion posture is defined as the forward posture and the backward posture of the wheels (as shown in FIG. 2A); when the angle V between the center line of the two wheels and the X-axis is an acute angle (as shown in FIG. 2B), the motion posture is defined as the right-turn posture and the forward-right posture of the wheels; when the angle between the center line of the two wheels and the X-axis is an obtuse angle, the motion posture is defined as the left-turn posture and the forward-left posture of the wheel (not shown). The backward-left posture and the backward-right posture can also be defined by defining the deflection angle of the wheel. It should be noted that the definition of the motion posture in this embodiment is only one of the methods, and the motion posture can also be defined through other definition methods. When the robot includes multiple motion postures, when controlling the motion of the robot, the robot needs to be adjusted to the corresponding motion posture first. The robot control method further includes the step of:

Step T10: obtaining the motion-posture information of the robot. The step T10 is between the step T1 and the step T2. It can be understood that in the step T10, the remote terminal obtains initial virtual configuration information of the robot in the motion posture, and the initial virtual configuration information represents the motion-posture information of the robot in the motion posture; or at least one of the plurality of modular units or at least one wheel obtains and stores the initial virtual configuration information of the robot instead of transmitting it to the remote terminal. The initial virtual configuration information includes one or more of position information, module type information, module quantity information, initial angle information between the upper and lower sub-modules, type information of the wheel, position information of the wheel, quantity information of the wheel, and the initial angle between the sub-module and the wheel; the initial virtual configuration information also includes one or more of other information that defines the connection relationship between adjacent module units. The module unit or the wheel transmits its own module type information to the cell body through wireless transmission; after all the module units and the wheels transmit their position information to the remote terminal, the remote terminal obtains the module quantity information and wheel quantity information of the robot; the module unit detects the initial angles of the upper and lower sub-modules thereof and wirelessly transmits their initial angle information to the remote terminal, and the module unit detects the initial angles of the wheels and the sub-modules and wirelessly transmits their initial angle information to the remote terminal. It can be understood that the initial virtual configuration information corresponds to the posture information in the initial virtual configuration. When the robot needs to be adjusted to a corresponding motion posture, adjust the wheel and/or the main module to adjust the robot to the corresponding motion posture. The corresponding motion-posture information also includes one or more of position information, module type information, module quantity information, initial angle information between the upper and lower sub-modules, type information of the wheel, position information of the wheel, quantity information of the wheel, and the initial angle between the sub-module and the wheel; the corresponding motion-posture information also includes one or more of other information that defines the connection relationship between adjacent module units.

Figure 3:
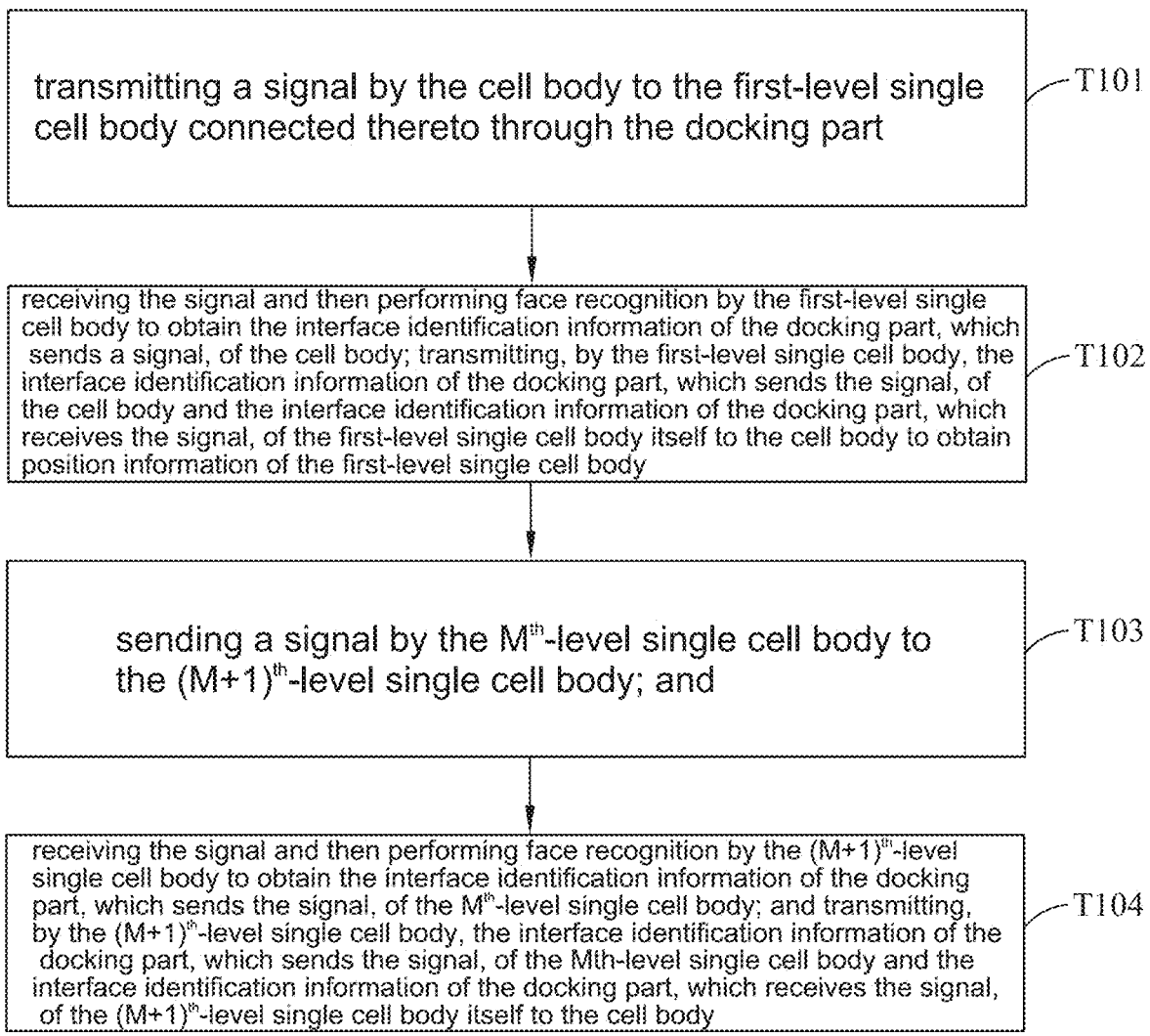
FIG. 3 is a schematic diagram of a sub-flowchart of step T0 of the robot control method of the first embodiment of the present disclosure.

Referring to FIG. 3, the plurality of module units of the robot may include a plurality of identical or different module units, and the plurality of module units include at least one module unit that can communicate with the remote terminal.

For example, in some embodiments, the plurality of module units includes one cell body and at least one single cell body, that is, the robot includes one cell body and at least one single cell body. The signal transmission process between the cell body and at least one single cell body is described as follows:

the cell body is configured to communicate with the remote terminal, the single cell body directly connected to the cell body is defined as a first-level single cell body, the single cell body connected to the first-level single cell body is defined as a second-level single cell body, and the single cell body connected to an $M^{th}$-level single cell body is defined as a $(M+1)^{th}$-level single cell body, M being an integer greater than or equal to 1. Obtaining the initial virtual configuration information of the robot specifically includes the steps of:

T101: transmitting a signal by the cell body to the first-level single cell body connected thereto through the docking part;

T102: receiving the signal and then performing face recognition by the first-level single cell body to obtain the interface identification information of the docking part, which sends a signal, of the cell body; transmitting, by the first-level single cell body, the interface identification information of the docking part, which sends the signal, of the cell body and the interface identification information of the docking part, which receives the signal, of the first-level single cell body itself to the cell body to obtain position information of the first-level single cell body;

T103: sending a signal by the $M^{th}$-level single cell body to the $(M+1)^{th}$-level single cell body; and T104: receiving the signal and then performing face recognition by the $(M+1)^{th}$-level single cell body to obtain the interface identification information of the docking part, which sends the signal, of the $M^{th}$-level single cell body; and transmitting, by the $(M+1)^{th}$-level single cell body, the interface identification information of the docking part, which sends the signal, of the $M^{th}$-level single cell body and the interface identification information of the docking part, which receives the signal, of the $(M+1)^{th}$-level single cell body itself to the cell body.

It can be understood that the signal transmitted from the cell body to the first-level single cell body and the signal transmitted from the $M^{th}$-level single cell body to the $(M+1)^{th}$-level single cell body are preferably electrical signals or wireless signals. When there are only the cell body and the first-level single cell body in the robot, the steps T103 and T104 can be omitted.

When the plurality of module units of the robot include a plurality of identical module units, one of the module units is defined as a main module unit, that is, the above-mentioned cell body; the module unit directly connected to the main module unit is a first-level single cell body, the module unit connected to the first-level single cell body is defined as a second-level single cell body, and the module unit connected to an $M^{th}$-level single cell body is defined as a $(M+1)^{th}$-level single cell body, M being an integer greater than or equal to 1. The above steps T101-T104 are also performed. As a variant, the multi-level cell units can directly transmit their respective position information directly to the remote terminal instead of transmitting to the main module unit.

In summary, the process of obtaining the position information of the plurality of module units of the robot is as follows: each module unit recognizes the interface identification information of the docking part of the adjacent module unit connected thereto, and obtains its position information based on the interface identification information of the docking part of the adjacent module unit and the interface identification information of the docking part by which the module unit itself is connected to the adjacent module unit.

It can be understood that the process of obtaining the position information of the wheels of the robot may be the same as the process of obtaining the position information of the plurality of module units. That is, one of the wheels can be defined as the cell body, and the module unit or the wheel directly connected to the cell body is the first-level single cell body. The specific identification process is the same as above, which will not be repeated here.

It can also be understood that when the robot is a non-modular robot, the position information between the wheels of the robot and the main body and the angle information can also be obtained according to the method used between the plurality of modules to represent the posture information of the robot.

In some other embodiments of the present disclosure, the remote terminal can also directly obtain the angle information, position information, etc. of each module unit and wheel, and the remote terminal processes the corresponding angle information and position information to obtain the current configuration information of the modular robot to complete the recognition of the current entity configuration of the modular robot.

In addition, the following step is performed before or at the same time as the step T101:

T100: sending broadcast signals by the module unit or the wheel to instruct the respective single cell bodies to prepare for face recognition. It may be understood that wireless communication can be performed between module units. The wireless communication may be wifi communication, Bluetooth communication, or zigbee communication, preferably zigbee communication. The module unit or the wheel first instructs other module units connected thereto to enter a face recognition preparation state in a form of broadcast signals, and then performs the face recognition action after the module units connected thereto receive the electrical signals.

In the step T101, each docking part on the cell body sends different electrical signals to a plurality of first-level single cell bodies. In the step T102, the plurality of first-level single cell bodies obtains interface identification information of the docking parts of the cell body connected thereto according to the received different electrical signals. Each first-level single cell body responds to the cell body with the interface identification information of the docking part, which transmits the electrical signals, of the cell body and the interface identification information of the docking part, which receives the electrical signal, of the first-level single cell body itself. The cell body calculates position information of this first-level single cell body through an algorithm. After the plurality of first-level single cell bodies performs the same action, the cell body obtains position information of the plurality of first-level single cell bodies. In the same way, in the steps T103 and T104, each docking part on the $M^{th}$-level single cell body sends different electrical signals to a plurality of $(M+1)^{th}$-level single cell bodies. The plurality of $(M+1)^{th}$-level single cell bodies obtain interface identification information of the docking parts of the $M^{th}$-level cell body connected thereto according to the received different electrical signals. Each $(M+1)^{th}$-level single cell body responds to the cell body with the interface identification information of the docking part, that transmits the electrical signal, of the $M^{th}$-level single cell body and the interface identification information of the docking part, that receives the electrical signal, of the $(M+1)^{th}$-level cell body itself. The cell body calculates the position information of the $(M+1)^{th}$-level single cell body through an algorithm. After the plurality of $(M+1)^{th}$-level single cell bodies perform the same action, the cell body obtains position information of the plurality of $(M+1)^{th}$-level single cell bodies. After a series of face recognition, the cell body obtains the position information of all single cell bodies, thereby obtaining the configuration information of the robot, that is, the motion-posture information of the robot.

It may be understand that, when the cell body or single cell body simultaneously sends different electrical signals to a plurality of lower-level single cell bodies, the plurality of lower-level single cell bodies responds to the cell body with their position information based on a time sequence according to the interface identification information of the docking part, that transmits different electrical signals, of the cell body or a higher-level single cell body; or when the cell body or single cell body sends the same or different electrical signals to a plurality of lower-level single cell bodies based on a time sequence, the plurality of lower-single cell bodies sequentially responds to the cell body with their position information according to a time sequence in which the electrical signals are received. For example, when the cell body is provided with two docking parts, the interface identification information is defined as 1 and 2, respectively, and the cell body simultaneously sends two different electrical signals to two first-level single cell bodies connected thereto, it is set that the first-level single cell body connected to a docking part 1 first makes a response with its position information, and after a wait of 10s (the specific time may be adjusted), the first-level single cell body connected to a docking part 2 makes a response with its position information.

In addition, between the steps T102 and T103, it further includes the step of:

T102a: stopping sending electrical signals by the cell body, and instructing, by the cell body, the first-level single cell body connected directly to the cell body to send electrical signals to the second-level single cell body connected to the first-level single cell body. It may be understood that, in the step T102a, the cell body preferably instructs the first-level single cell body in a form of broadcast signals. It may be understood that before the $M^{th}$-level single cell body sends electrical signals, the cell body controls the $M^{th}$-level single cell body to send electrical signals to a plurality of $(M+1)^{th}$-level single cell bodies based on a time sequence in a form of broadcast signals according to the interface identification information of a plurality of docking parts of the $M^{th}$-level single cell body. The electrical signals sent by the $M^{th}$-level single cell body to the plurality of $(M+1)^{th}$-level single cell bodies may be the same or different, and it is preferable that the plurality of docking parts of the $M^{th}$-level single cell body sends different electrical signals.

In addition, in the steps T102 and T104, after receiving the position information transmitted from the single cell bodies, the cell body individually numbers the respective single cell bodies, and stores the position information of each single cell body in association with the corresponding number. When the cell body communicates with the remote terminal, the cell body transmits the position information of each single cell body and its number to the remote terminal. After the remote terminal sends action control information to the cell body, the cell body decomposes the control information according to different numbers and transmits the decomposed control information to the respective single cell bodies according to the numbers.

It can be understood that, in the step T10, it may be a remote terminal or a module unit storing initial virtual configuration information to generate the initial virtual configuration of the robot according to the initial virtual configuration information. The remote terminal generates the initial virtual configuration of the robot through three-dimensional simulation or three-dimensional modeling according to the obtained initial virtual configuration information. The initial virtual configuration can be displayed on the remote terminal to facilitate the user to view the motion posture of the robot at any time.

In the above step T2, the speed is associated with the motion speed of the robot and/or obtained through user customization. The association with the motion speed of the robot is that the speed is obtained by pushing the robot to move in a corresponding motion posture. The speed of user customization can be understood as editing, inputting or other definition methods on the operation interface of the robot. It should be noted that when the number of wheels is at least two, the speed of some wheels may be obtained through motion, and the speed of other wheels may be obtained through customization.

In the above step T2, the actual test speed of the wheels is tested by artificially pushing the robot to walk on a road, which is called the test-drive mode and used to obtain the speed ratio of each wheel. Then the actual speed of the wheels during actual walking is set according to the speed ratio by the user. By obtaining the speed ratio of each wheel through the test-drive mode, the wheels can have a better balance during actual motion. In order to obtain the actual test speed of the wheels during the test, speed sensors can be installed on each wheel, and the actual speed of each wheel during motion can be obtained through the speed sensors.

Of course, as a variant, the motion of the robot can also be completed via the app software operating system.

As an example, when the speed is obtained by artificially pushing the robot to walk on a road, the robot control method includes the steps of:

T1: providing a robot, with at least one wheel and at least one motion posture;

T2: regulating the robot to a corresponding motion posture, saving motion-posture information corresponding to the motion posture, pushing the robot to walk on a road in the corresponding motion posture to obtain the speed of the wheel, and generating preset motion control information according to the speed and the motion-posture information;

T3: constructing and forming an operating model based on the preset action control information; and T4: outputting, by the operating model, actual motion control information of a motion according to user's input to control the robot to perform the motion.

Figure 4:
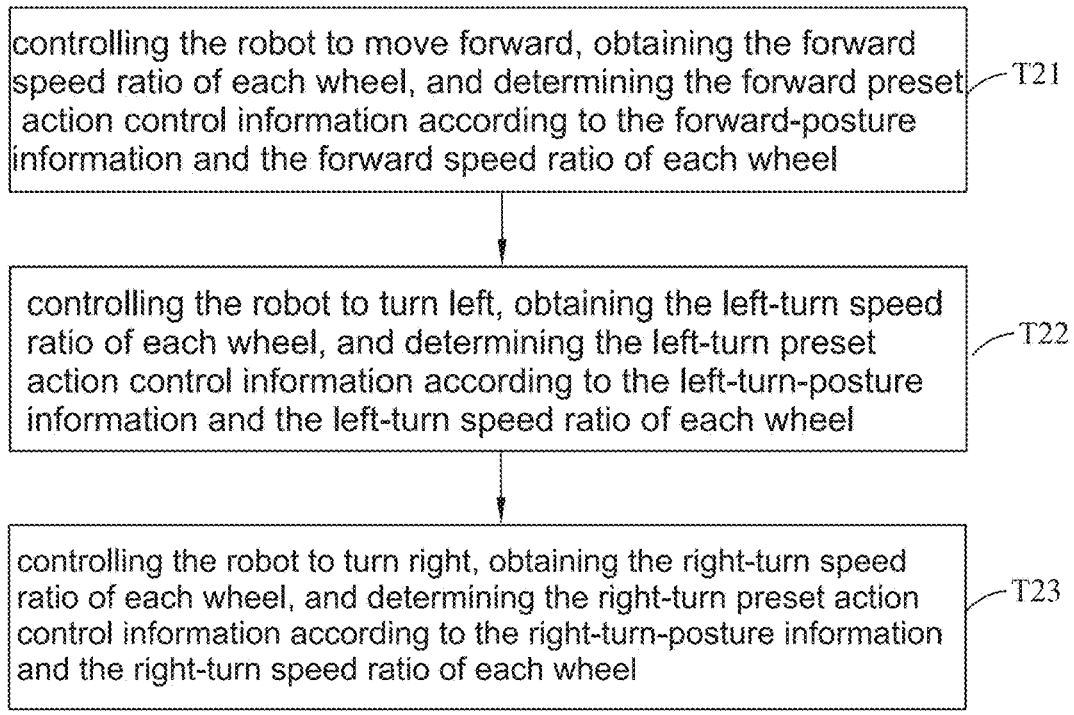
FIG. 4 is a schematic diagram of a sub-flowchart of step T2 of the robot control method of the first embodiment of the present disclosure.

Referring to FIG. 4, the step T2 includes the steps of:

T21: controlling the robot to move forward, obtaining the forward speed ratio of each wheel, and determining the forward preset action control information according to the forward-posture information and the forward speed ratio of each wheel;

T22: controlling the robot to turn left, obtaining the left-turn speed ratio of each wheel, and determining the left-turn preset action control information according to the left-turn-posture information and the left-turn speed ratio of each wheel; and T23: controlling the robot to turn right, obtaining the right-turn speed ratio of each wheel, and determining the right-turn preset action control information according to the right-turn-posture information and the right-turn speed ratio of each wheel.

In the above steps T21, T22, and T23, controlling the robot to move forward, controlling the robot to turn left, and controlling the robot to turn right include pushing the robot to walk on a road or manipulate the robot on the app.

The speed obtained by controlling the motion of the robot under the corresponding motion posture may be realized in the following manner. When the number of the wheels is at least two, the forward speed ratio can be obtained in the following manner: first, obtaining the actual test speed corresponding to each wheel; calculating according to the actual test speed of each wheel to obtain the speed ratio between each wheel.

Specifically, in the above step T21, after the forward speed ratio is obtained, the actual speed of one of the wheels can be given, and then the speed of each wheel is calculated according to the speed ratio between each wheel to obtain the speed of all wheels as the speed of generating preset motion control information.

In addition, the left-turn speed ratio and the right-turn speed ratio are obtained in the same manner as the forward speed ratio, which will not be repeated here.

Figure 5:
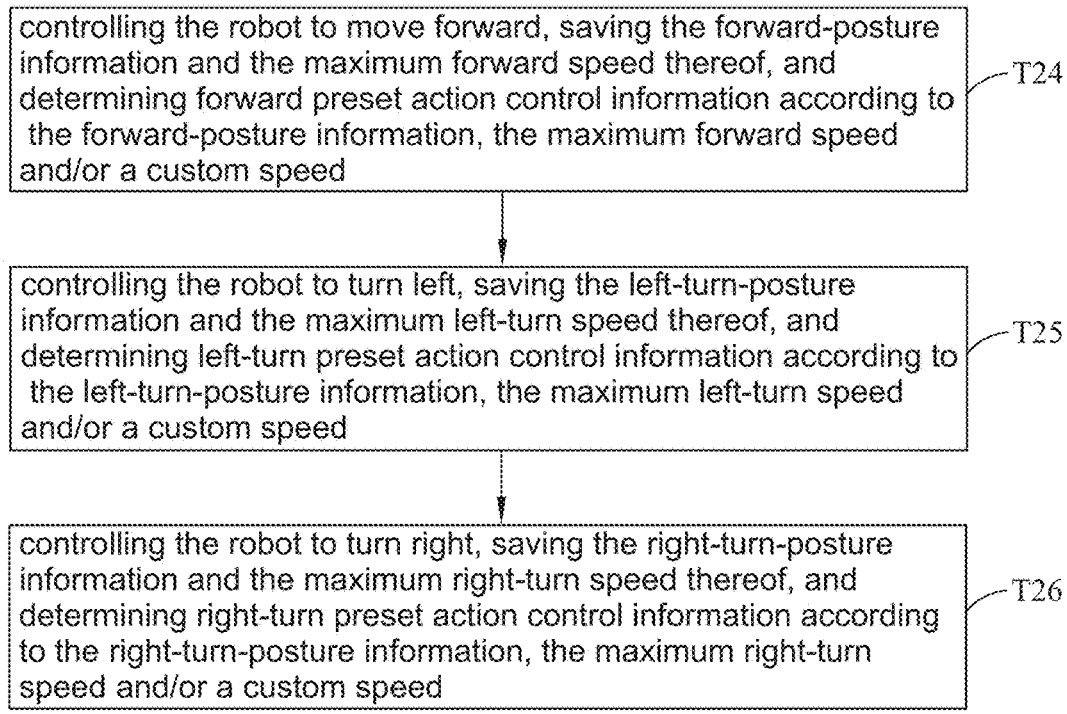
FIG. 5 is a schematic diagram of a sub-flowchart of step T2 of a variant embodiment of the robot control method according to the first embodiment of the present disclosure.

Referring to FIG. 5,

In some other embodiments, the step T2 includes the steps of:

T24: controlling the robot to move forward, saving the forward-posture information and the maximum forward speed thereof, and determining forward preset action control information according to the forward-posture information, the maximum forward speed and/or a customized speed;

T25: controlling the robot to turn left, saving the left-turn-posture information and the maximum left-turn speed thereof, and determining left-turn preset action control information according to the left-turn-posture information, the maximum left-turn speed and/or a customized speed; and T26: controlling the robot to turn right, saving the right-turn-posture information and the maximum right-turn speed thereof, and determining right-turn preset action control information according to the right-turn-posture information, the maximum right-turn speed and/or a customized speed.

In the above steps T24, T25 and T26, controlling the robot to move forward, controlling the robot to turn left, and controlling the robot to turn right include pushing the robot to walk on a road or manipulate the robot on the app. The speed obtained by controlling the motion of the robot in a corresponding motion posture can be specifically realized by the following manner: setting the speed of one of the wheels as the actual maximum speed during the actual motion of the wheel, and converting the actual maximum speed of other wheels according to the speed ratio to obtain the maximum forward speed, the maximum left-turn speed, and the maximum right-turn speed of all wheels. Of course, the maximum speed can also be obtained directly according to the actual motion speed of the robot.

In the above steps T21, T22 and T3, by calculating the speed ratio between the wheels, and according to the speed ratio and user's actual experience, the actual speed of each wheel can be entered and modified on the operation interface.

Referring to FIG. 6, in some other embodiments, a visual ratio bar Z can be provided on the operation interface; the control point F on the ratio bar Z can slide between points N and M along the ratio bar; the point M represents the maximum speed ratio of each wheel. When sliding along the point M to the point N, the speed ratio of each wheel is converted according to the length of the entire sliding bar occupied by the MN. For example, the maximum speed ratio at the beginning is 10:9:8:9; when sliding to the midpoint of the ratio bar Z, the speed ratio of each wheel will be 5:4.5:4:4.5.

Referring to FIG. 7, in the step T2, when the number of the wheels is at least two, in the step T24, T25 or T26, the way to obtain the speed in the user-customization manner may be achieved through the steps of:

S21, setting the maximum actual speed of one of the wheels during actual motion and the speed ratio of each wheel; and S22, converting the actual maximum speed of the other wheels according to the speed ratio.

In the above step S21, the maximum actual speed of one of the wheels and the speed ratio of each wheel may be set on a controller that transmits signals to the robot. The controller may be an APP loaded on a remote terminal. The remote terminal can be a mobile phone, an iPad, a computer or other equipment. Of course, it can be understood that the speed of one of the wheels can be adjusted separately after the speed of each wheel is set according to the speed ratio; or, the speed of each wheel can be set directly without setting the speed ratio of each wheel.

Figure 8:
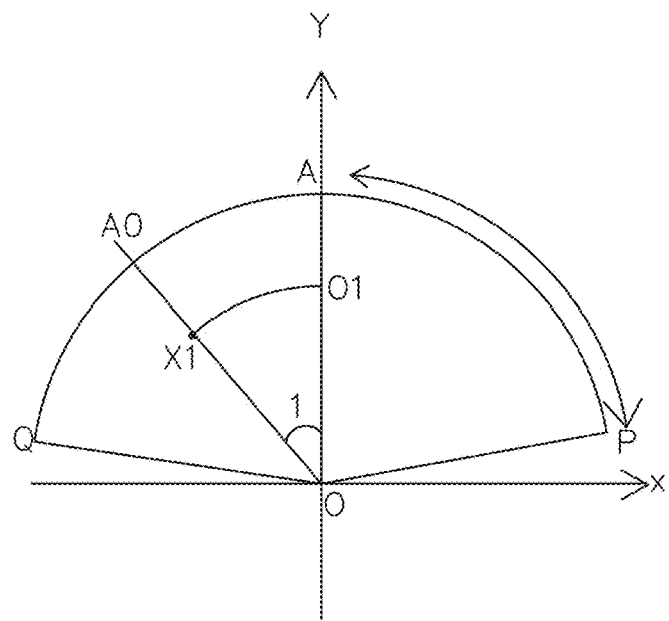
FIG. 8 is a schematic diagram of a fan-shaped area formed in the robot control method of the first embodiment of the present disclosure.

Referring to FIG. 8, a coordinate system including X-axis and Y-axis perpendicular to each other is constructed. A circular area or a fan-shaped area is defined on the coordinate system with the origin as the center to form a manipulation area, and the fan-shaped area includes areas located in the first quadrant and the second quadrant. The fan-shaped area in FIG. 8 is OPQ.

When the robot is in the forward posture, the forward motion of the robot is defined as: pushing the robot to move from the center O to the vertex A. The speed thereof at the center O is 0, and the speed thereof at the vertex A is the maximum forward speed. The maximum speed thereof is defined as V1.

When the robot is in the left-turn posture, the left-turn motion of the robot is defined as: pushing the robot to move from the vertex A to the left-end point Q along the arc. The speed when moving to the left-end point Q is the maximum left-turn speed. The maximum speed thereof is defined as V2.

When the robot is in the right-turn posture, the right-turn motion of the robot is defined as: pushing the robot to move from vertex A to the right-end point P along the arc. The speed when moving to the right-end point P is the maximum right-turn speed. The maximum speed thereof is defined as V3. It should be noted that the forward motion, the left-turn motion and the right-turn motion explained by constructing the above coordinate system are only for intuitive presentation. The trajectory of the motion of the robot can be slightly deviated from the above trajectory or can be other custom trajectories, which can be set according to the needs of users.

Referring to FIG. 8, the step T3 includes the steps of:

T31: constructing a coordinate system, defining a circular area or a fan-shaped area on the coordinate system with the origin as the center to form a manipulation area; the fan-shaped area including areas located in the first and second quadrants; taking the manipulation area as the fan-shaped area OPQ as an example.

T32: mapping the forward preset action control information, the left-turn preset action control information, and the right-turn preset action control information to the upper vertex, the left vertex, and the right vertex of the manipulation area, respectively; that is, the preset motion control information of each vertex including speed, posture information, etc.

The step T3 further includes the step of:

T33: defining user's input as a control point located in the coordinate system; when the control point is located in the first and second quadrants, the control point located in the first quadrant being a forward-right-motion control point, and forward-right preset action control information being obtained by the interpolation operation of the forward preset action control information and the right-turn preset action control information;

the control point located in the second quadrant being a forward-left-motion control point; forward-left preset action control information being obtained by the interpolation operation of the forward preset action control information and the left-turn preset action control information;

the control point located on the Y-axis of the coordinate system being obtained by converting the forward preset action control information according to the distance between the control point and the center; the control point located on the arc AQ being obtained by converting the left-turn preset action control information according to the arc length between the control point and the vertex A; the control point located on the arc AP being obtained by converting the right-turn preset action control information according to the arc length between the control point and the vertex A.

In the step T33, the control point X1 located in the second quadrant is taken as an example for explanation. The speed calculation process is as follows: first, the speed value VAO at the point A0 is obtained by converting according to the arc length AAO; then the speed is obtained by converting the VAO according to the distance between the O1 and the center; the posture information is slowly and gradually deflected from the straight posture according to the angle ∠1.

Referring to FIG. 8 again, the step T3 further includes the steps of:

T34: interpolating to the lower vertex of the manipulation area according to the forward preset action control information to form backward preset action control information;

interpolating to the third quadrant of the manipulation area according to the backward preset action control information and the left-turn preset action control information to form backward-left preset action control information;

interpolating to the fourth quadrant of the manipulation area according to the backward preset action control information and the right-turn preset action control information to form backward-right preset action control information.

Figure 9:
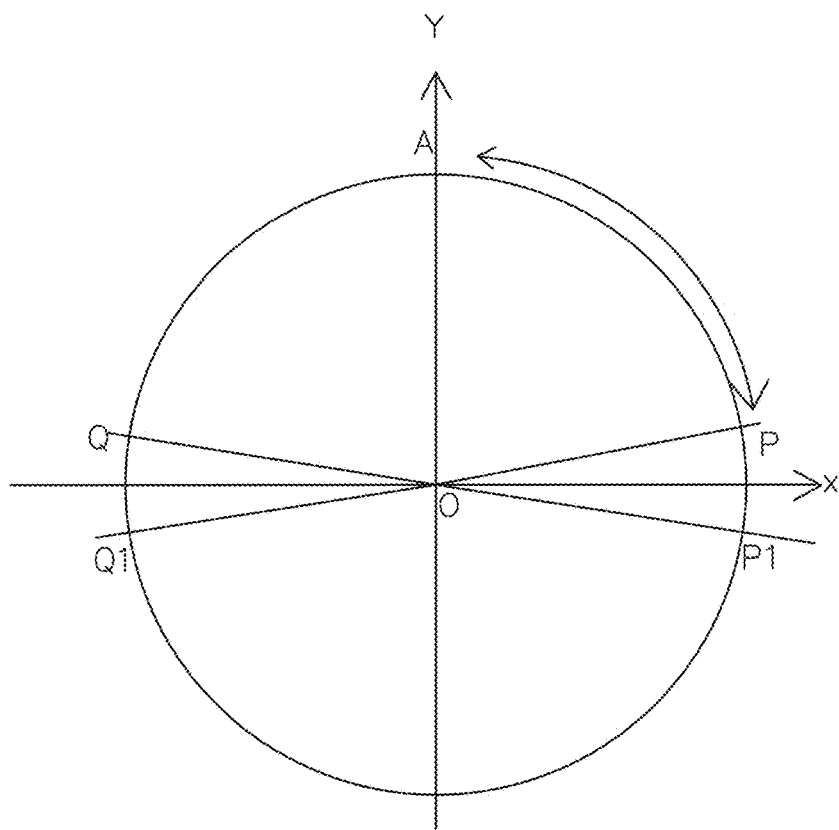
FIG. 9 is a schematic diagram of a circular area formed in the robot control method of the first embodiment of the present disclosure.

Referring to FIG. 9, the fan-shaped area further includes areas located in the third and fourth quadrants. In the fan-shaped area, there are blank areas Q0Q1 between the first quadrant and the fourth quadrant and P0P1 between the second quadrant and the fourth quadrant where no control points are disposed. The robot cannot be manipulated through the blank areas.

Referring to FIG. 9 again, 9, an operating disc is provided on a Graphic User Interface for operating the robot, and the operating disc corresponds to the circular area or the fan-shaped area on the coordinate system.

The step T4 includes the steps of:

T41: operating on the operating disc to form an input;

T42: calculating, by the operating model, the actual motion control information according to the control point corresponding to the input to control the robot to perform a motion.

In the above step T41, a manipulation signal can be formed by user touching the circular or fan-shaped manipulation area on the manipulation disc. Angle-sensing sensors and speed-sensing sensors are provided on each single cell body and each wheel.

Second Embodiment

Figure 10:
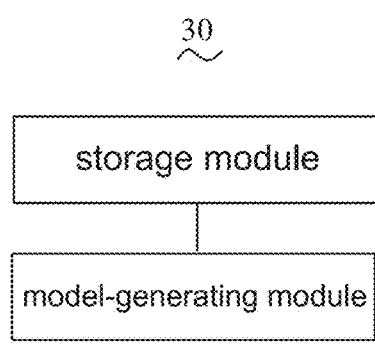
FIG. 10 is a schematic diagram of a module structure of a robot control system according to a second embodiment of the present disclosure.

Referring to FIG. 10, a second embodiment of the present disclosure further provides a robot control system 30, which is used to control a robot spliced by at least one wheel and a main body. The robot control system 30 includes:

A storage module 31, for storing motion-posture information and preset action control information corresponding to the motion posture of the robot;

A model-generating module 33, for constructing and forming an operating model according to the preset action control information.

The robot control system 30 further includes speed sensors provided on each of the wheels. The speed sensor may be a code-disc encoder for measuring the actual speed of the wheel. The actual speed of the wheel includes the linear speed and the angular speed of the wheel.

Third Embodiment

Figure 11:
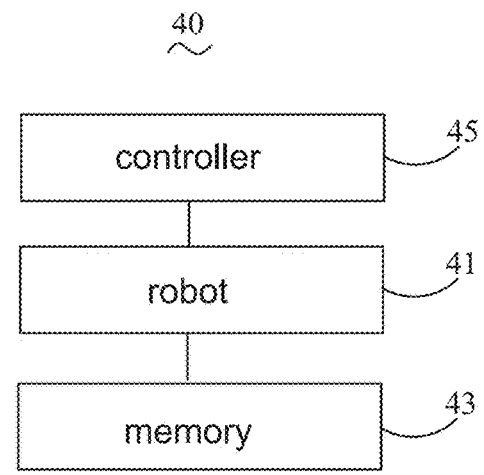
FIG. 11 is a schematic diagram of a module structure of a robot control system according to a third embodiment of the present disclosure.

Referring to FIG. 11, a third embodiment of the present disclosure further provides a robot control system 40, and the robot control system 40 further includes:

A robot 41, which is assembled from a main body and at least one wheel connected to the main body and has an initial physical structure;

A memory 43 and one or more programs stored in the memory 43; the memory 43 communicating with the module unit, and the programs being used to execute the following step instructions:

saving the motion-posture information corresponding to the motion posture, and generating preset action control information according to the speed of the wheel and the motion-posture information;

constructing and forming an operating model according to the preset action control information; and outputting, by the operating model, actual motion control information according to the user's input to control the robot to perform a motion.

In some other embodiments, the robot is a modular robot, the main body includes a plurality of module units, and the wheels are connected to the module units.

In addition, the plurality of module units include a cell body and at least one single cell body; each docking part has unique interface identification information; the single cell body directly connected to the cell body is defined as a first-level single cell body; the obtaining of the initial virtual configuration information of the robot specifically includes the following steps:

transmitting a signal by the cell body to the first-level single cell body connected thereto through the docking part;

receiving the signal and then performing face recognition by the first-level single cell body to obtain the interface identification information of the docking part, which sends a signal, of the cell body; transmitting, by the first-level single cell body, the interface identification information of the docking part, which sends the signal, of the cell body and the interface identification information of the docking part, which receives the signal, of the first-level single cell body itself to the cell body to obtain position information of the first-level single cell body.

The robot control system 40 further includes a controller 45, and signals can be transmitted between the controller 45 and the robot 41.

Figure 12A:
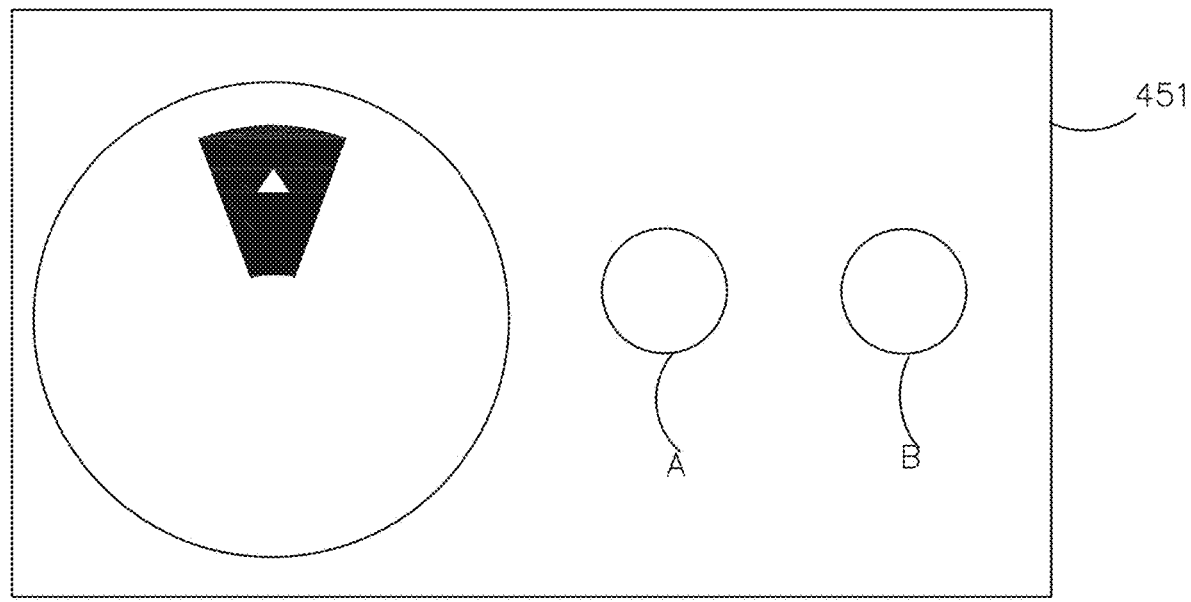
FIG. 12A is a first schematic diagram of an interface of a display screen of a controller of the robot control system of the third embodiment of the present disclosure.
Figure 12B:
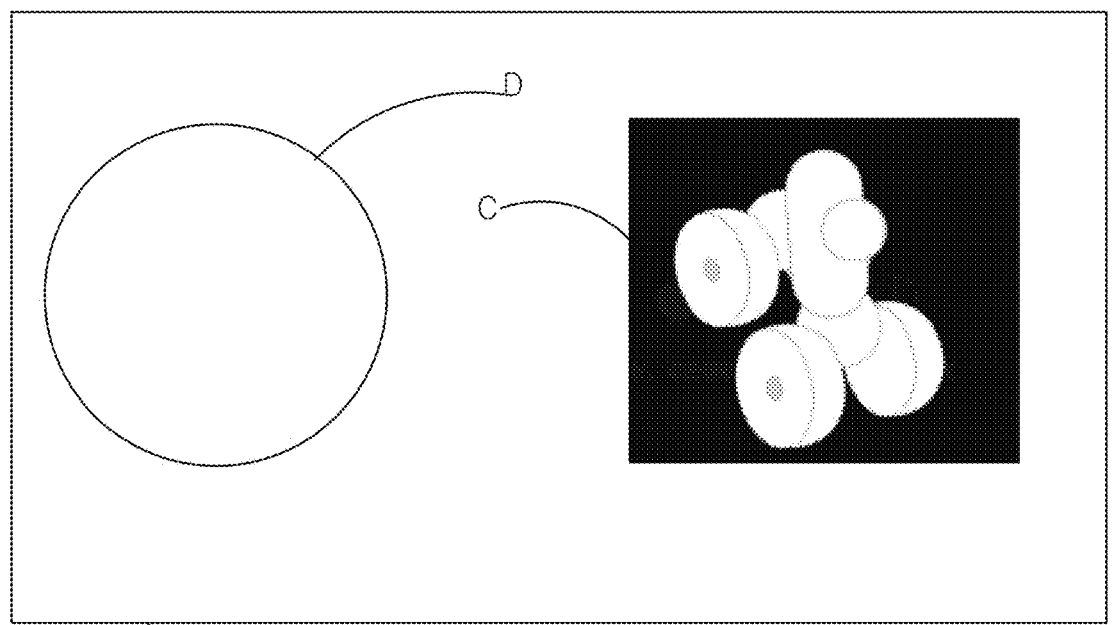
FIG. 12B is a second schematic diagram of the interface of the display screen of the controller of the robot control system of the third embodiment of the present disclosure.
Figure 12C:
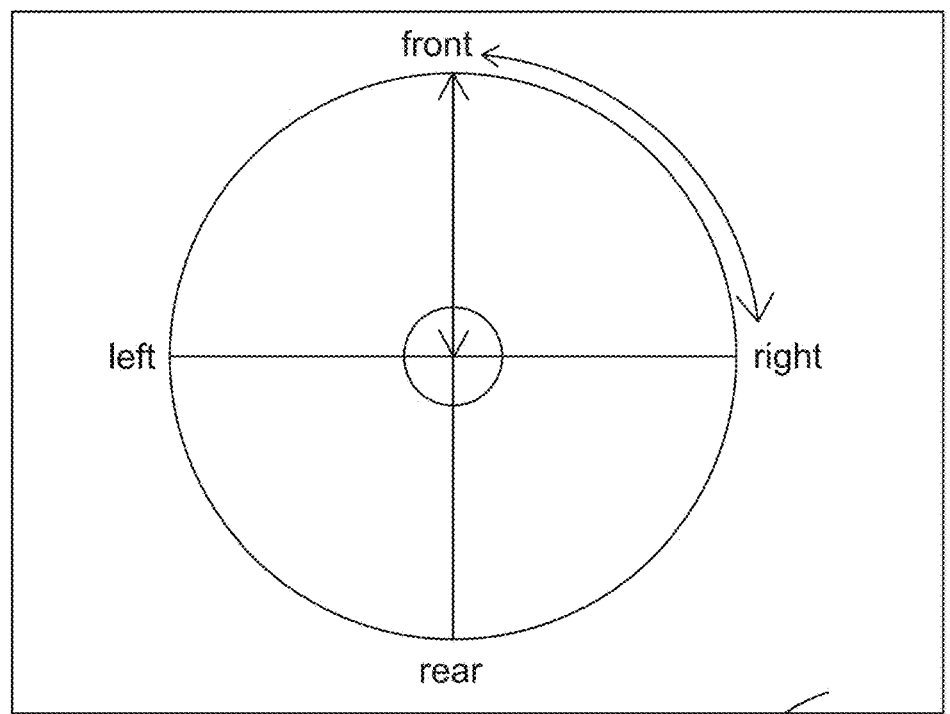
FIG. 12C is a third schematic diagram of the interface of the display screen of the controller of the robot control system of the third embodiment of the present disclosure.

The controller 45 may be provided on a remote mobile terminal that includes electronic devices such as mobile phones, tablet computers, or computers. Referring to FIG. 12A, FIG. 12B and FIG. 12C, the controller 45 includes a display screen 451. By manipulating the display screen 451, the preset motion control information under the corresponding motion posture can be edited, saved or set. The display screen 451 includes a motion-posture setting area A corresponding to the first editing button, the speed setting area B corresponding to the second editing button, a virtual-configuration display area C, an operation-video-playing area D and an edited steering wheel E. The operation process will be described below in conjunction with the display interface of the display screen 451: when setting the forward-posture preset action control information, first click on the motion-posture setting area A to enter the interface shown in FIG. 12B; then move the entity configuration according to the tutorial in the operation-video-playing area D to make the robot in the forward posture; after the adjustment is completed, save the motion-posture information corresponding to the corresponding forward posture; after the posture frame is saved, click on the speed setting area B to push the robot to move forward to obtain the motion speed or obtain the speed through user customization; after the speed is adjusted, save the speed; the first edit button is used to set the robot to a corresponding motion posture, and the second edit button is used to set the speed of the wheel.

The setting methods of the left-turn posture and the right-turn posture are the same as the setting methods of the forward posture, which will not be repeated here. The formation of the preset motion control information of the forward-left posture, the forward-right posture, the backward-left posture, and the backward-right posture is the same as the method of the first embodiment, which will not be repeated here. Referring to FIG. 12C, when the preset motion control information in the corresponding motion posture has been edited, an operating disc is provided on the controller 45, and the operating disc corresponds to the circular area or the fan-shaped area on the coordinate system. The user operates on the operating disc to form an input; at the same time, the operating model calculates actual motion control information according to the control point corresponding to the input to control the robot to execute the motion.

The display screen 451 presents at least one ratio bar, and at least one of the forward speed ratio, the left-turn speed ratio and the right-turn speed ratio is adjusted by manipulating the ratio bar.

Fourth Embodiment

A modular robot, which is used to execute the robot control method of the first embodiment and the variant embodiment.

The above descriptions are only preferred embodiments of the present disclosure and are not intended to limit the present disclosure. Any modification, equivalent replacement and improvement made within the principles of the present disclosure shall fall within the protection scope of the present disclosure.

The invention claimed is:

1. A robot control method, comprising steps of:
T1: providing a robot, with at least one wheel and at least one motion posture;
T2: regulating the robot to a motion posture, saving motion-posture information corresponding to the motion posture, generating preset action control information based on a speed of the wheel and the motion-posture information;
T3: constructing and forming an operating model based on the preset action control information; and
T4: outputting, by the operating model, actual motion control information of a motion according to user's input to control the robot to perform the motion;
wherein in the step T2, the speed of the wheel can be obtained by pushing the robot to walk on a road in the motion posture, or obtained by controlling the robot to move via an app, and/or obtained by user customization;
wherein a number of the wheel is at least two, the motion posture comprises a forward posture, a left-turn posture and a right-turn posture, and the corresponding motion-posture information comprises forward-posture information, left-turn-posture information and right-turn-posture information;
the step T2 comprising the steps of:
T21: controlling the robot to move forward, obtaining a forward speed ratio of each wheel, determining forward preset action control information according to the forward-posture information and the forward speed ratio of each wheel;
T22: controlling the robot to turn left, obtaining the left-turn speed ratio of each wheel, determining left-turn preset action control information according to the left-turn-posture information and the left-turn speed ratio of each wheel; and
T23: controlling the robot to turn right, obtaining the right-turn speed ratio of each wheel, determining right-turn preset action control information according to the right-turn-posture information and the right-turn speed ratio of each wheel;
wherein the step T2 further comprises the steps of:
T24: controlling the robot to move forward, saving the forward-posture information and a maximum forward speed of the robot, determining the forward preset action control information further according to the maximum forward speed and/or a customized speed;
T25: controlling the robot to turn left, saving the left-turn-posture information and a maximum left-turn speed of the robot, determining the left-turn preset action control information further according to the maximum left-turn speed and/or a customized speed; and
T26: controlling the robot to turn right, saving the right-turn-posture information and a maximum right-turn speed of the robot, determining the right-turn preset action control information further according to the maximum right-turn speed and/or a customized speed;
wherein the step T3 comprises the steps of:
T31: constructing a coordinate system, defining a fan-shaped area with an origin as a center on the coordinate system to form a manipulation area, the fan-shaped area including areas located in a first quadrant and a second quadrant;

T32: establishing a correspondence between the forward preset action control information and an upper vertex of the manipulation area, a correspondence between; the left-turn preset action control information and a left vertex of the manipulation area, and a correspondence between the right-turn preset action control information and a right vertex of the manipulation area;

wherein an operating disc is provided on a Graphic User Interface for operating the robot, and the operating disc corresponds to a circular area or the fan-shaped area on the coordinate system;

the step T4 comprising the steps of:

T41: operating on the operating disc to form an input;

T42: calculating, by the operating model, the actual motion control information according to a control point corresponding to the input to control the robot to perform a motion.

2. The robot control method according to claim 1, wherein the step T3 further comprises the step of:

T33: defining user's input as a control point located in the coordinate system;

based on that the control point is located in the first and second quadrants;

the control point located in the first quadrant being a forward-right-motion control point, and forward-right preset action control information being obtained by an interpolation operation of the forward preset action control information and the right-turn preset action control information;

the control point located in the second quadrant being a forward-left-motion control point, and forward-left preset action control information being obtained by the interpolation operation of the forward preset action control information and the left-turn preset action control information;

the control point located on a Y-axis of the coordinate system being obtained by converting the forward preset action control information according to a distance between the control point and the center.

3. The robot control method according to claim 2, wherein the fan-shaped area further comprises areas located in a third quadrant and a fourth quadrant; in the fan-shaped area, there are blank areas where no control points are disposed between the first quadrant and the fourth quadrant and between the second quadrant and the third fourth quadrant.

4. The robot control method according to claim 3, wherein the step T3 further comprises the step of:

T34: establishing a correspondence between a lower vertex of the manipulation area and backward preset action control information according to the forward preset action control information based on an interpolation operation;

interpolating to the third quadrant of the manipulation area according to the backward preset action control information and the left-turn preset action control information to form backward-left preset action control information;

interpolating to the fourth quadrant of the manipulation area according to the backward preset action control information and the right-turn preset action control information to form backward-right preset action control information.

5. The robot control method according to claim 1, wherein at least one of the forward speed ratio, the left-turn speed ratio and the right-turn speed ratio is adjusted according to a preset adjustment ratio.

6. A robot control system, comprising:

a robot, assembled from a main body and at least two wheels connected to the main body, to allow the robot to have an initial entity structure;

a memory, and one or more programs stored in the memory; the memory communicating with the main body, and the programs being used to execute the robot control method according to claim 1.

7. The robot control system according to claim 6, wherein the main body comprises a plurality of module units, the robot control system further comprises a controller, and signal transmission can be performed between the controller and the robot; the controller comprises a display screen, which defines at least one operating disc by which motions of the robot can be controlled.

8. The robot control system according to claim 7, wherein the display screen defines at least one ratio bar, and at least one of the forward speed ratio, the left-turn speed ratio and the right-turn speed ratio can be adjusted by manipulating the ratio bar.

9. The robot control system according to claim 8, wherein a first edit button and a second edit button are defined on the display screen, the first edit button is used to set the robot to a corresponding motion posture, and the second edit button is used to set the speed of the at least two wheels.

10. A modular robot, for executing the robot control method according to claim 1.

* * * * *